(12) United States Patent
Mishra et al.

(10) Patent No.: US 10,275,247 B2
(45) Date of Patent: Apr. 30, 2019

(54) APPARATUSES AND METHODS TO ACCELERATE VECTOR MULTIPLICATION OF VECTOR ELEMENTS HAVING MATCHING INDICES

(71) Applicant: Intel Corporation, Santa Clara, CA (US)

(72) Inventors: Asit K. Mishra, Hillsboro, OR (US); Deborah T. Marr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 604 days.

(21) Appl. No.: 14/672,156

(22) Filed: Mar. 28, 2015

(65) Prior Publication Data

US 2016/0283240 A1     Sep. 29, 2016

(51) Int. Cl.
*G06F 9/30*     (2018.01)

(52) U.S. Cl.
CPC ........ *G06F 9/30036* (2013.01); *G06F 9/3001* (2013.01); *G06F 9/30018* (2013.01)

(58) Field of Classification Search
CPC ............. G06F 9/300036; G06F 9/3001; G06F 9/30018; G06F 9/3893
See application file for complete search history.

(56) References Cited

U.S. PATENT DOCUMENTS

| | | | | |
|---|---|---|---|---|
| 4,910,667 A | * | 3/1990 | Tanaka ................ | G06F 15/8053 711/168 |
| 5,175,863 A | * | 12/1992 | Jones, Jr. .................. | G06F 7/57 712/36 |
| 5,206,822 A | * | 4/1993 | Taylor ..................... | G06F 17/16 708/607 |
| 6,182,164 B1 | * | 1/2001 | Williams ............ | G06F 12/0835 710/15 |
| 6,223,198 B1 | * | 4/2001 | Oberman .................. | G06F 7/53 708/620 |
| 6,243,724 B1 | * | 6/2001 | Mander ................. | G06F 3/0483 707/E17.008 |
| 9,483,243 B2 | * | 11/2016 | Reid ......................... | G06F 8/45 |
| 2003/0222879 A1 | * | 12/2003 | Lin .......................... | G06F 7/57 345/530 |

(Continued)

OTHER PUBLICATIONS

Williams, Samuel, Leonid Oliker, Richard Vuduc, John Shalf, Katherine Yelick, and James Demmel. "Optimization of sparse matrix-vector multiplication on emerging multicore platforms." Parallel Computing 35.3 (2009): 178-94. Web.*

(Continued)

*Primary Examiner* — Benjamin P Geib
*Assistant Examiner* — Andrew J Cromer
(74) *Attorney, Agent, or Firm* — Nicholson De Vos Webster & Elliott LLP

(57) ABSTRACT

Methods and apparatuses relating to accelerating vector multiplication. In one embodiment, an apparatus includes a first buffer to store a first cache line of indices for elements of a first vector, a second buffer to store a second cache line of indices for elements of a second vector, a comparison unit to compare each index of the first cache line of indices with each index of the second cache line of indices, a plurality of multipliers to each multiply an element from the first vector and an element from the second vector for an index match from the comparison unit to produce a product, and an adder to add together the product from each of the plurality of multipliers.

24 Claims, 13 Drawing Sheets

(56) References Cited

U.S. PATENT DOCUMENTS

| | | | | |
|---|---|---|---|---|
| 2005/0132165 A1* | 6/2005 | Ford | G06F 9/30025 | 712/22 |
| 2008/0091924 A1* | 4/2008 | Jouppi | G06F 9/30036 | 712/216 |
| 2009/0030960 A1* | 1/2009 | Geraghty | H03M 7/30 | 708/203 |
| 2011/0106871 A1* | 5/2011 | Symes | G06F 9/3887 | 708/603 |
| 2012/0060015 A1* | 3/2012 | Eichenberger | G06F 15/8069 | 712/4 |
| 2012/0278590 A1* | 11/2012 | Lin | G06F 15/7867 | 712/30 |
| 2013/0166516 A1* | 6/2013 | Reid | G06F 9/30072 | 707/690 |
| 2013/0212354 A1* | 8/2013 | Mimar | G06F 9/30021 | 712/4 |
| 2014/0006469 A1* | 1/2014 | Gueron | G06F 7/5324 | 708/620 |
| 2014/0006755 A1* | 1/2014 | Gueron | G06F 9/3001 | 712/222 |

OTHER PUBLICATIONS

IEEE Computer Society, "IEEE Standard for Floating-Point Arithmetic," IEEE Std 754™—2008, Aug. 29, 2008, New York, 70 pages.
IEEE, "IEEE Standard for Binary Floating-Point Arithmetic," 1985, 23 pages.
Intel® Architecture, "Instruction Set Extensions and Future Features Programming Reference," 319433-034, May 2018, 145 pages.
Intel, "Intel® 64 and IA-32 Architectures Software Developer Manuals," Oct. 12, 2016, 19 pages.
Lopes A.R., et al., "A Fused Hybrid Floating-Point and Fixed-Point Dot-product for FPGAs," International Symposium on Applied Reconfigurable Computing, Reconfigurable Computing: Architectures, Tools and Applications, Mar. 2010, LNCS, vol. 5992, 12 pages.

* cited by examiner

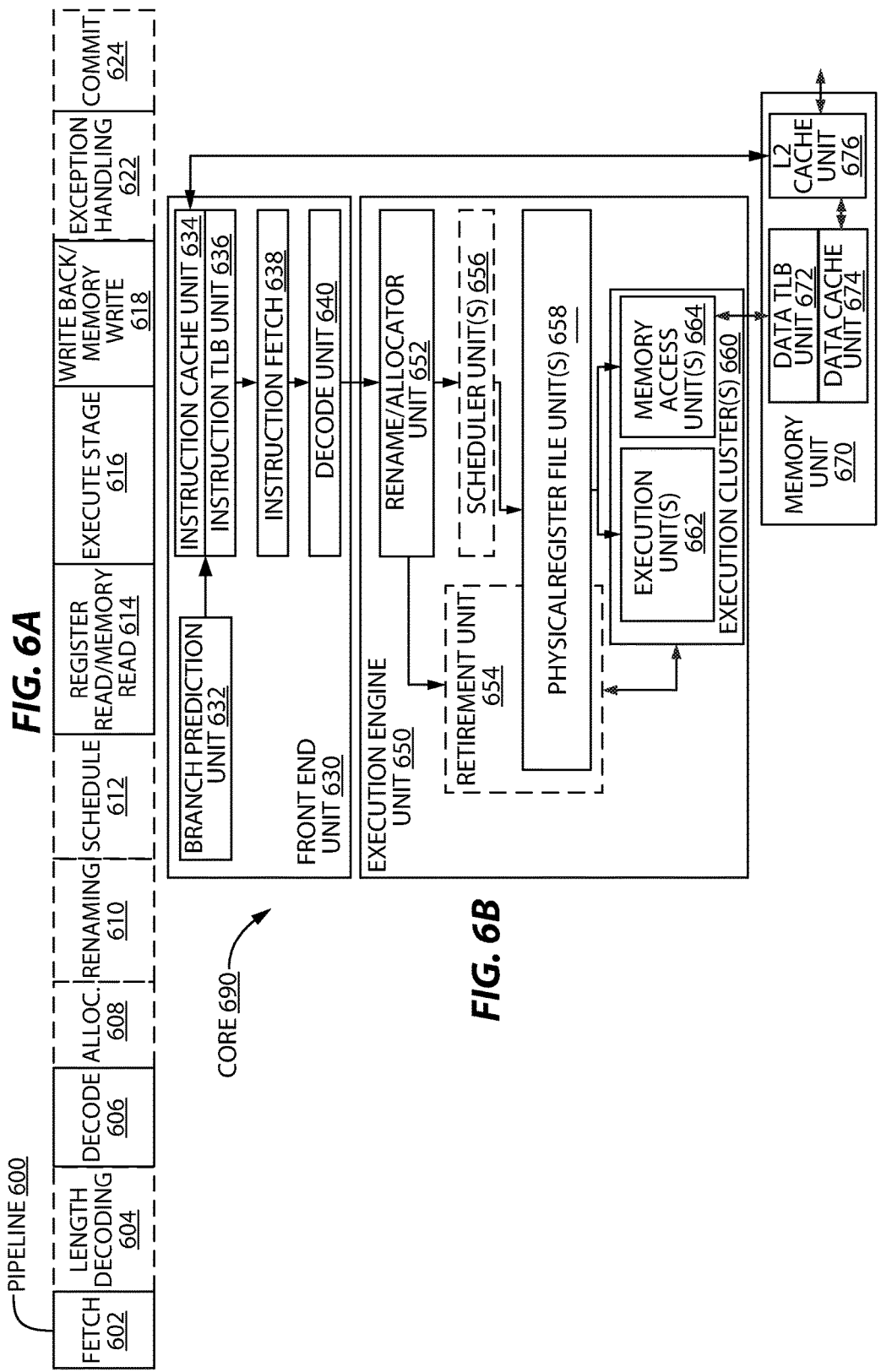

APPARATUSES AND METHODS TO ACCELERATE VECTOR MULTIPLICATION OF VECTOR ELEMENTS HAVING MATCHING INDICES

TECHNICAL FIELD

The disclosure relates generally to electronics, and, more specifically, an embodiment of the disclosure relates to accelerating vector multiplication.

BACKGROUND

A processor, or set of processors, executes instructions from an instruction set, e.g., the instruction set architecture (ISA). Instructions (e.g., code) to be executed may be separated into multiple threads for execution by various processor resources. Multiple threads may be executed in parallel. Further, a processor may utilize out-of-order execution to execute instructions, e.g., as the input(s) for such instructions are made available. Thus, an instruction that appears later in program order (e.g., in code sequence) may be executed before an instruction appearing earlier in program order.

BRIEF DESCRIPTION OF THE DRAWINGS

The present disclosure is illustrated by way of example and not limitation in the figures of the accompanying drawings, in which like references indicate similar elements and in which:

FIG. 6A is a block diagram illustrating both an exemplary in-order pipeline and an exemplary register renaming, out-of-order issue/execution pipeline according to embodiments of the disclosure.

FIG. 6B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
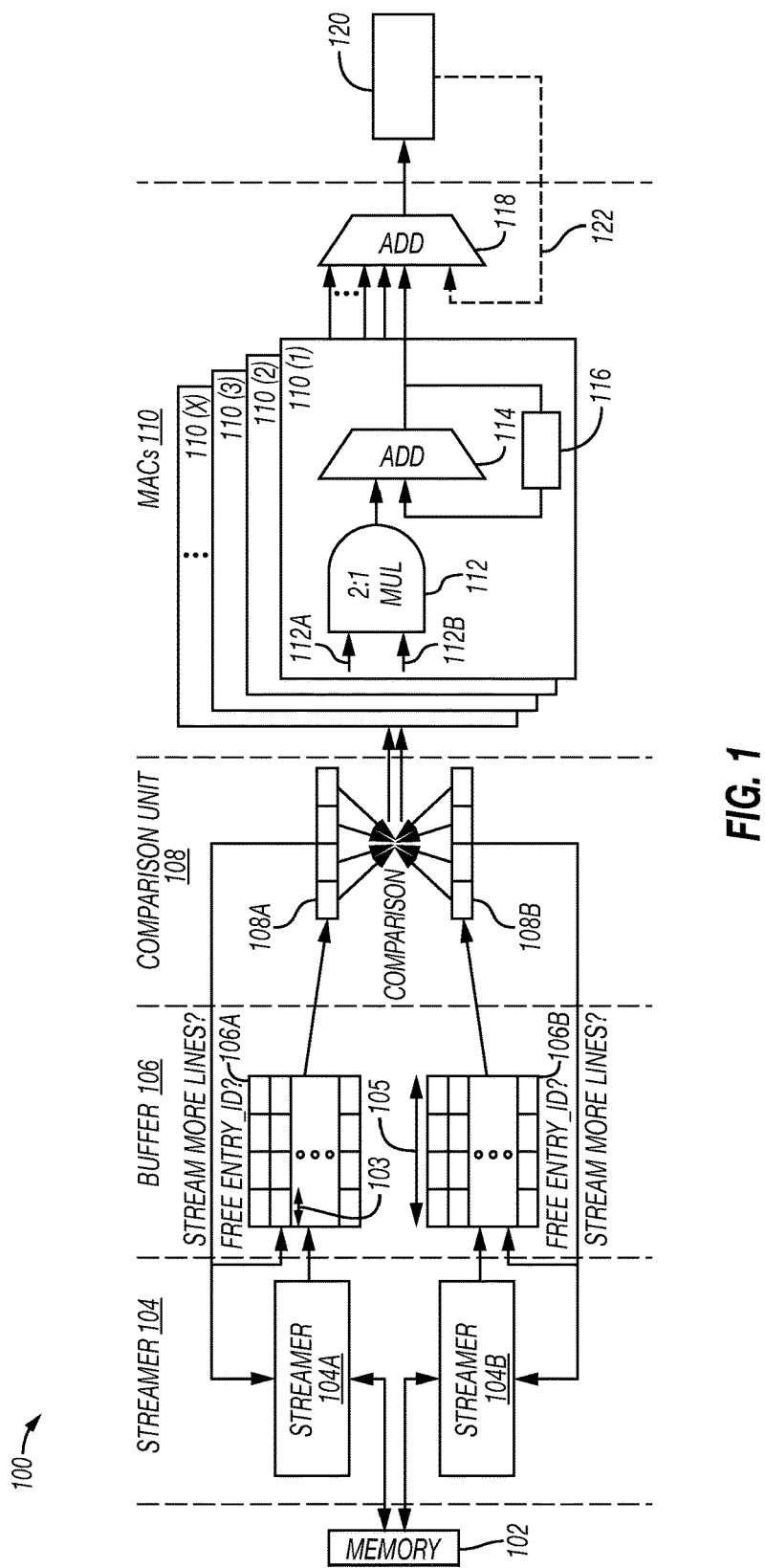
FIG. 1 illustrates an accelerator circuit to accelerate vector multiplication according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decode unit (decoder) decoding macro-instructions. A processor (e.g., having one or more cores to decode and/or execute instructions) may operate on data, for example, in performing arithmetic, logic, or other functions.

Certain functions may include operations on vectors (e.g., a tuple, array, or other ordered list of data elements (entries) with a corresponding index to identify each element), for example, vectors operating on other vectors, vectors operating on matrices, matrices operating on matrices, etc. An element of a vector may generally refer to a discrete section of data that represents a single value and is identified by its own index value. A vector may be a column vector or a row vector. Elements of a vector may be numbers (e.g., integer, floating-point, etc.). A matrix may generally refer to a two-dimensional (2D) vector, e.g., to represent data in two or more dimensions. A matrix may be formed from multiple (e.g., one-dimensional (1D)) vectors. The number of rows (e.g., represented by the variable m) and columns (e.g., represented by the variable n) of a vector may be referred to as the size, order, or dimension. A one-dimensional vector may include a single value (e.g., number) as an index for each element of the vector. A two-dimensional vector may include two values (e.g., numbers) as an index for each element of the vector. Certain operations on a plurality of vectors may multiply each element from one vector with a corresponding element of another vector to produce a product for each pair of elements. The product (e.g., as an addend) for each pair of elements may be added together to form the sum.

One the operations (e.g., kernel function) that may (e.g., frequently) be used is the squared distance computation pattern (L2-norm between two vectors). The squared distance function f (e.g., $\|f\|$) between two vectors $\alpha$ and $\beta$ is given as:

$$\|\alpha - \beta\|^2 = \alpha^2 + \beta^2 - 2\alpha \cdot \beta \quad (1)$$

where · is the dot (e.g., inner or scalar) product between the two vectors. The dot product of two vectors $\alpha$ and $\beta$ is given as:

$$\alpha \cdot \beta = \Sigma(\alpha(i) * \beta(i)) \text{ with } 0 \leq i \leq \min(\text{length}(\alpha), \text{length}(\beta)) \quad (2)$$

In one embodiment, a vector (or matrix) may be sparse (e.g., where >50% of the elements are zero or null). A sparse vector may be represented (e.g., in memory) in a compressed sparse row (CSR) format where individual vector elements are represented as <index:element> pairs, e.g., with the index denoting the column identification and the element being the data value. Although a colon (:) is illustrated as dividing the element and its index, other alternatives may be utilized to indicate which portion is the element and which is the index.

In certain embodiments (e.g., in a kernelized implementation of a machine learning kernel), this dot product of two vectors (e.g., represented in CSR format) may dominate the computational time of an entire application. In one embodiment without an accelerator circuit (e.g., the circuit as disclosed herein), more than 90% of computation time for a machine learning kernel (e.g., kernel function) is spent in the dot product loop. In one embodiment, a vector multiplication operation may include tens of thousands to millions of vectors and each vector may have tens of thousands to millions of elements.

Certain embodiments herein disclose a hardware accelerator circuit to accelerate vector multiplication. One embodiment includes a hardware accelerator circuit to accelerate a vector dot product (e.g., sparse-vector·sparse-vector) computation kernel. In one embodiment without the use of a hardware accelerator circuit according to this disclosure (e.g., by using a processor core's arithmetic logic unit (ALU) or floating point unit (FPU) without an accelerator circuit according to this disclosure), a vector dot product computation kernel may be dominated by mispredicted branches that lead to an average of four cycles per index computation and the use of a hardware accelerator circuit according to this disclosure may reduce that time to one cycle. Hardware accelerator circuit may be an application-specific integrated circuit (ASIC).

A hardware accelerator circuit may be part of a processor, e.g., part of a core or separate from the core. In one embodiment, an accelerator circuit(s) is (e.g., part of) an execution (e.g., functional) unit of a processor core (e.g., processor core 690 in FIG. 6B). A processor with a hardware accelerator circuit may include an instruction (e.g., with a particular opcode) in its instruction set to cause data to be sent to the hardware accelerator circuit. In one embodiment, a processor may decode that instruction once for a vector (e.g., a vector pair), and the hardware circuit may complete its operations on that vector (e.g., vector pair) without decoding the instruction again. In one embodiment, a hardware accelerator circuit includes a finite state machine (FSM) to control its operations, e.g., as discussed herein.

FIG. 1 illustrates an accelerator circuit 100 to accelerate vector multiplication according to embodiments of the disclosure. Circuit 100 may be utilized to accelerate a (e.g., sparse) vector·(e.g., sparse) vector calculation. A first vector and a second vector may be stored in memory 102. Memory 102 may be cache memory and/or system memory (e.g., separate from a cache memory). The first vector and second vector may each have the same number of elements therein and thus the same number of indices. Each element may be the same maximum size (e.g., number of bits). Each element for the same index (e.g., index 2 in each vector) may have the same maximum size (e.g., number of bits). Note that although certain components may be referred to in the singular, for example, a streamer 104, there may be two or more such components utilized.

Streamer 104 (e.g., separate streamers 104A, 104B) may stream (e.g., portions of) a first vector (e.g., beginning at the address py as an example) and/or (e.g., portions of) a second vector (e.g., beginning at the address px as an example). Streamer may have direct memory access (DMA). Streamer may receive a command to stream a certain vector(s) from a control unit (not shown). Control unit may be a finite state machine (FSM). Control unit may be part of comparison unit 108. Streamer 104 may stream (e.g., load in from memory and provide as an output) individual vector elements in the CSR format (represented as index:element pairs). Streamers 104A, 104B may simultaneously operate. Streamer may not stream any elements with a zero value. The circuit may track the number of zero valued elements and/or non-zero valued elements, for example, to use in determining if the streamer or other components of the circuit have completed their task(s). Streamer 104 (e.g., separate streamers 104A, 104B) may not output the vector elements in index order (e.g., sorted). One example of this is discussed further below.

Streamer 104 may output each vector's elements in the CSR format (represented as index:element pairs) to a buffer 106. Buffer (e.g., data buffer) may generally refer to a storage device to temporarily store data. First streamer 104A may output an element of the first vector (e.g., in the CSR format as an index:element pair) to a first buffer 106A. Second streamer 104B may output an element of the second vector (e.g., in the CSR format as an index:element pair) to a second buffer 106B. A streamer may output one element (e.g., one index:element pair) at a time. Note that although four discrete storage elements are shown in a line of buffers 106A, 106B, any single or plurality of discrete storage elements may be utilized. In one embodiment, a streamer 104 streams (e.g., provides) the elements (e.g., index:element pairs) to a buffer as they are available, e.g., which may be Out-of-(program) Order (OoO). In one embodiment, a streamer 104 may stream one cache line worth of data (e.g., of index:element pairs) at a time (e.g., in one processor clock cycle) into a buffer 106. In one embodiment, a streamer 104 (e.g., each streamer 104A, 104B) streams (e.g., provides) one element (e.g., one index:element pair) to a line of a buffer (e.g., each buffer 106A, 106B), for example, then moving to another line of the buffer once the previous line includes one cache line worth of data (e.g., of index:element pairs). As used herein, a cache line may generally refer to a block (e.g., a sector) of data that may be managed (e.g., by communication resources) as a unit for coherence purposes. A cache line may include multiple, discrete sections. In one embodiment, each section holds a single index:element pair. A width 105 of cache line may have a number of equally sized sections of a single width 103. For example, a 512 bit wide cache line may have 4 sections of 128 bits of storage for each section, 8 sections with 64 bits of storage for each section, etc.

Buffer 106 may then provide pieces of data (e.g., sized less than an entire vector of index:element pairs) to the comparison unit 108. For example, first buffer 106A may provide a cache line of indices (e.g., including in that cache line each index's element as well, e.g., in the CSR format) to first vector data input 108A (e.g., register) of comparison unit 108. For example, second buffer 106B may provide a cache line of indices (e.g., including in that cache line each index's element as well, e.g., in the CSR format) to second vector data input 108B (e.g., register) of comparison unit 108. First buffer 106A and second buffer 106B may provide their data (e.g., each with a plurality of index:element pairs) to the comparison unit 108 simultaneously or within the same clock cycle. Size of inputs (e.g., registers) of comparison circuit may be a cache line (e.g., the same size as the amount of data provided by a buffer). Size of output of comparator may be the size of an element of a vector. Comparison unit 108 may be a comparator. Comparison unit 108 may include further circuitry, e.g., to control data flow.

Comparison unit 108 may compare each index (e.g. from an index:element pair) of the first vector data input 108A to each index (e.g. from an index:element pair) of the second vector data input 108B. In such an embodiment, any matching indices (e.g., such that they include the same value) indicate to the circuit 100 that the corresponding elements of those indices may be forwarded on, e.g., to the multiplier-accumulator (MAC) units 110. Any non-matching indices for that subset of indices of the first and second vectors that are being compared (e.g., when the comparison unit 108 has not found a match for that index (e.g. from an index:element pair) of the first vector data input 108A with any index (e.g. from an index:element pair) of the second vector data input 108B) may then be sent back to be checked again in the future. For example, comparison unit 108 may send back those non-matching index (indices) to their respective buffers or streamers. For example, comparison unit 108 may leave the non-matched index (indices) of one vector data input (108A or 108B) and then load the empty parts of the inputs (108A,108B) with data from the buffer 106.

In performing a comparison of two indices (one from each of the vectors), comparison unit 108 may subtract an index from the first vector from an index in a second vector, e.g., such that a zero (e.g., null) value indicates that index from the first vector matches that particular index from the second vector and a non-zero value indicates a non-matching index for those indices. For any circuit in this disclosure, please note that the control logic (e.g., providing control signals) may not be depicted so as to avoid obscuring the figures.

Circuit 100 (e.g., comparison unit 108) may also purge (e.g., from the buffer or data inputs (108A,108B) from the buffer any element (e.g., and its index) that has a zero value as well as it may purge (e.g., from the buffer or data inputs (108A,108B)) the corresponding index from the other vector as the zero will also make zero the product with any value contained in the other vector during the multiplication step herein.

Circuit 100 (e.g., comparison unit 108) may, e.g., upon completion of a comparison of the subset of indices in vector data inputs (108A,108B), request another input (e.g., a cache line of data) from a buffer and may request a streamer stream (e.g., load) more data (e.g., vector index:element pair(s)) from memory 202 (e.g., "stream more lines" shown schematically in FIG. 1). Circuit 100 (e.g., comparison unit 108) may, e.g., upon completion of a comparison of the subset of indices in vector data inputs (108A,108B), request a buffer free up an entry (e.g., an entry for a matched index), for example, of a cache line thereof (e.g., "free entry identification (ID)") shown schematically in FIG. 1). The circuit may repeatedly iterate this process until complete, e.g., each non-zero element of the first vector has been multiplied with the corresponding non-zero element of the second vector.

Accelerator circuit 100 may include a multiplier accumulator (MAC) unit section 110 with a plurality of multiplier accumulator units (MACs). The variable "X" in multiplier accumulator unit 110(X) is to indicate that any number of MACs may be used. In one embodiment, circuit 100 includes one MAC for each section of a vector data input (108A,108B) of the comparison unit 108, e.g., one MAC for each possible match in a single comparison operation. For example, MACs 110(1) through 110(X) may operate in parallel on any matching indices (e.g., for simultaneous operation or to all operate within one clock cycle). Comparison unit 108 may then provide the elements from the index match (e.g., matching indices) of the first vector and the second vector to a respective input 112A, 112B of a multiplier 112 (multiplier unit) to perform a multiplication thereof to produce a product, and similarly for the other MACs, for example, from zero MACs to all the MACs may perform a calculation during each iteration of the circuit 100, e.g., depending on how many indices matched during the comparison for those indices. The accumulator (e.g., accumulator register) 116 (e.g., for the storage of intermediate results) of the MAC 110(1) may be set (e.g., reset) to zero, for example, for the first iteration (e.g., of a comparison) for a set of first and second vectors. Thus the accumulator 116 will then hold the first product and then each further product may be added to it (as an addend), e.g., as in the dot product equation (2). A multiply-accumulate process for all MACs 110(1)-110(X) may occur in one processor clock cycle. When the first vector and second vector have had all of their index matched, non-zero elements multiplied together, circuit 100 may then send all of the individual MAC results to adder 118 (e.g., an adder having the same number of inputs as the total number of MACs (X)) to form a sum. Sum may be stored in memory (e.g., register 120). Writing of the sum to register 120 may indicate to the circuit that the operation is complete. Circuit may (e.g., in response to the writing to or data storage in register 120), notify (e.g., send a signal to) a processor core (e.g., that requested this operation on the first vector and second vector) that the accelerator is done with its work (e.g., the sum is ready).

Adder 118 may be controlled by circuit 100 (e.g., control logic) determining there are no further inputs into the comparison unit 108 or otherwise. A streamer may determine when a vector has been completely loaded by reaching a special value in the vector, e.g., "−1" in one embodiment with an unknown vector size). Other registers may be used in a circuit, e.g. in addition to those depicted.

In one embodiment, dotted line 122 indicates an optional output from the register 120 (or adder 118) may be added back as an input to the adder 118. For example, in a matrix calculation, multiple (e.g., sparse) vector·(e.g., sparse) vector calculations may be iteratively added together.

The following is one non-limiting example in a compressed sparse row (CSR) format where individual vector elements are represented as index:element pairs, e.g., where the index denotes the column number and a vector represents a row. First vector and second vector streamed from memory 102 in this example have 8 elements and their 8 respective indices.

First vector (V1) is [2:0.01 4:0.02 7:0.03 9:0.04 11:0.05 13:0.06 15:0.07 16:0.08]
Second vector (V2) is [1:0.01 2:0.02 4:0.03 7:0.04 10:0.05 14:0.06 15:0.07 17:0.08]
The accumulator 116 is set to zero.
Iteration 1:
1. Fetch [2:0.01 4:0.02 7:0.03 9:0.04] of V1 and [1:0.01 2:0.02 4:0.03 7:0.04] of V2 from the buffers (106A, 106B).
2. Do 4×4 index comparison (compare 2, 4, 7, 9 indices of V1 with each of 1, 2, 4 and 7 indices of V2) to find which indices match with comparison unit 108 (e.g., crossbar). In this case, there is an index match for indices 2, 4 and 7 from V1 and 2, 4 and 7 from V2. Forward the elements (values) corresponding to these indices to the multiplier accumulate units 110 (e.g., here using three of the MACs as there are three matches).
3. Do multiply with MACs 110 (0.01*0.02; 0.02*0.03; 0.03*0.04=Result (RES1, RES2, RES2) on each of three respective MACs).
4. Add 0 from accumulator registers (e.g., 116 for MAC 110(1) and RES1; 0+RES2, and 0+RES3) with adder (e.g., 114 for MAC 110(1) and store the result back into the accumulator register (e.g., 116 for MAC 110(1). Accumulator register for MAC 110(1) now stores RES1; accumulator register for MAC 110(2) now stores RES2; and accumulator register for MAC 110(3) now stores RES3.
Optionally: in one embodiment, compare non-matching last index of V1 with last index of V2 (in this case 9 with 7) to find out which one is less. Fetch 4 more index:element pairs of the vector for which the last index is lower. In this case, 7<9, so we fetch 4 more indices of V2 and repeat the steps in an iteration. In one embodiment a comparison unit may compare the last indices of V1 and V2 that are being compared in that iteration and (i) if they do not match, a cache line of index:vector pairs may be fetched from one of the vectors (e.g., buffers) and (ii) if they do match, then a cache line of index:vector pairs may be fetched from each of the vectors (e.g., buffers).
Iteration 2:
1. Fetch [2:0.01 4:0.02 7:0.03 9:0.04] of V1 and [10:0.05 14:0.06 15:0.07 17:0.08] of V2 from the buffers (106A, 106B).
2. Do 4×4 index comparison (compare 2, 4, 7, 9 indices of V1 with each of 10, 14, 15 and 17 indices of V2) to find which indices match with comparison unit 108.
In this case, nothing matches.
3. Skip multiply and add with MACs.
4. Skip add with accumulator register.
Optionally: in one embodiment, compare last index of V1 with last index of V2 (in this case 9 with 17). 9<17, so fetch 4 more index:element pairs of V1 and repeat the steps.
Iteration 3:
1. Fetch [11:0.05 13:0.06 15:0.07 16:0.08] of V1 and [10:0.05 14:0.06 15:0.07 17:0.08] of V2 from the buffers (106A, 106B).
2. Do 4×4 index comparison (compare 11, 13, 15, 16 indices of V1 with each of 10, 14, 15 and 17 indices of V2) to find which indices match. In this case, only indices 15 match ($3^{rd}$ section of V1 and $3^{rd}$ section of V2).
3. Do multiply 0.07*0.07=RES4 (with any MAC, e.g., selected by control logic).
4. Add value in accumulator register 116 (RES1) and RES4 with adder 114 and store it back into accumulator register 116. At this point, the accelerator circuit has used up all elements in each of the vectors V1 and V2, so the circuit 100 may instruct adder 118 to sum all of the values from each accumulator register of a MAC, and the circuit may send the final register 120 value to the invoking agent (core) and may send a signal that it is available to do additional work now.

An execution unit of this disclosure may also include a circuit to square a vector, e.g., with the result to be used in the vector squared portions of the L2 norm calculation, along with the accelerator circuits discussed herein.

Note that a single headed arrow herein may not be limited to one-way communication, for example, it may indicate two-way communication (e.g., both to and from that component). Any or all combinations of communications paths may be utilized in embodiments herein.

Figure 2:
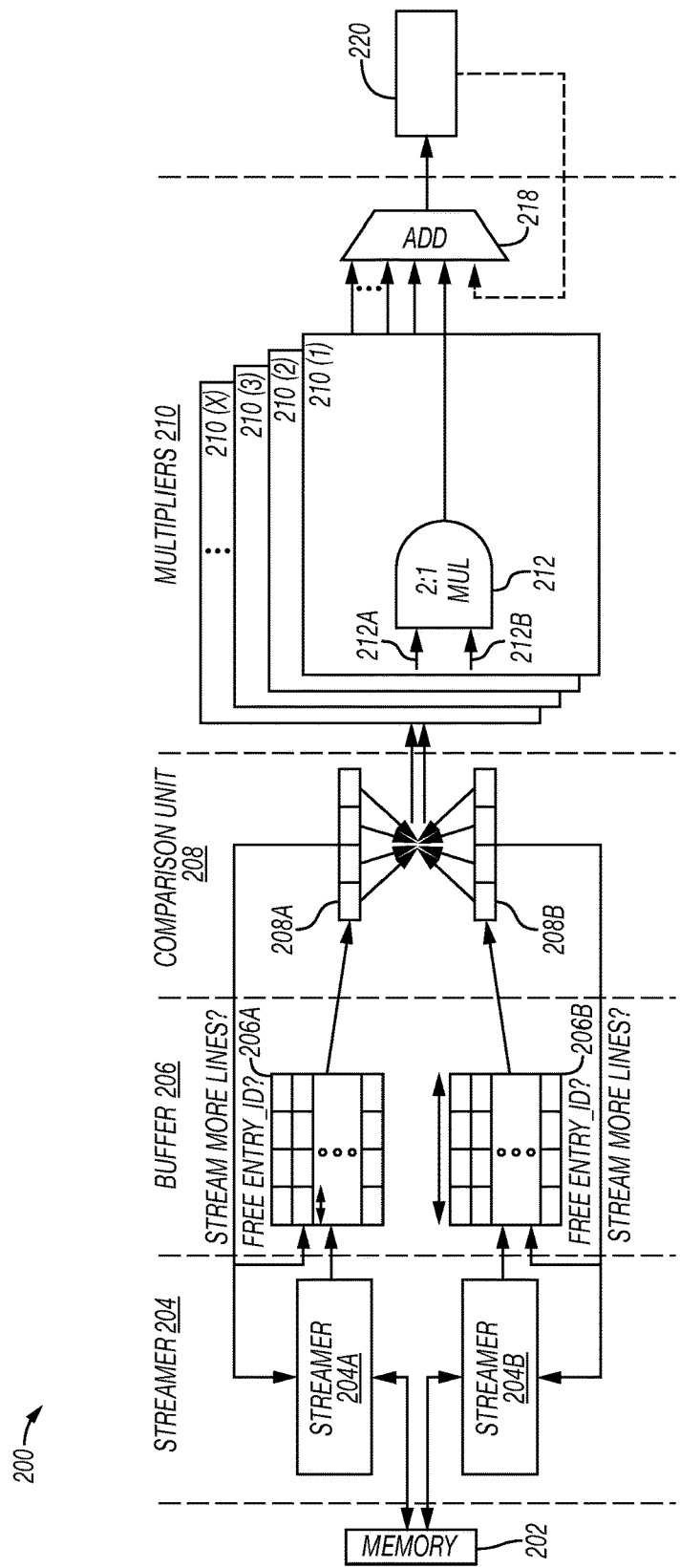
FIG. 2 illustrates an accelerator circuit to accelerate vector multiplication according to embodiments of the disclosure.

FIG. 2 illustrates an accelerator circuit 200 to accelerate vector multiplication according to embodiments of the disclosure. Memory 202, streamer 204 (e.g., streamers 204A, 204B), buffer 206 (e.g., buffers 206A, 206B), and comparison unit 208 may function as the memory 102, streamer 104 (e.g., streamers 104A, 104B), buffer 106 (e.g., buffers 106A, 106B), and comparison unit 108 described in reference to FIG. 1.

Accelerator circuit 200 may include a multiplier unit section 210 with a plurality of multipliers. The variable "X" in multiplier 210(X) is to indicate that any number of multipliers may be used. In one embodiment, circuit 100 includes one multiplier for each section of a vector data input (208A,208B) of the comparison unit 208, e.g., one multiplier for each possible match in a single comparison operation. For example, multiplier 210(1) through 210(X) may operate in parallel on any matching indices (e.g., for simultaneous operation or to all operate within one clock cycle). Comparison unit 208 may then provide the elements from the index match (e.g., matching indices) of the first vector and the second vector to a respective input 212A, 212B of a multiplier 212 (multiplier unit) to perform a multiplication thereof to produce a product, and similarly for the other multipliers, for example, from zero multipliers to all the multiplies may perform a calculation during each iteration of the circuit 200, e.g., depending on how many indices matched during the comparison for those indices. The results of the multiplications vectors may be added together by adder 218 (as addends), e.g., as in the dot product equation (2), and stored in register 220. For example, circuit 200 may send all of the individual multiplier results to adder 218 (e.g., an adder having the same number of inputs as the total number of multipliers (X)) to form a sum. A multiply with the multipliers 210(1)-210(X) and an addition with the adder 218 may occur in one processor clock cycle. Dotted line 122 indicates an optional output from the register 220 (or adder 218) may be added back as an input to the adder 218. For example, to iterate but without including an adder and accumulator for each of the plurality of multipliers 210. When the first vector and second vector have had all of their index matched, non-zero elements multiplied together, circuit 200 may then send the result (e.g., from register 220) to a processor core (e.g., that requested this operation on the first vector and second vector) to notify (e.g., indicate) the accelerator is done with its work (e.g., the sum is ready).

Figure 3:
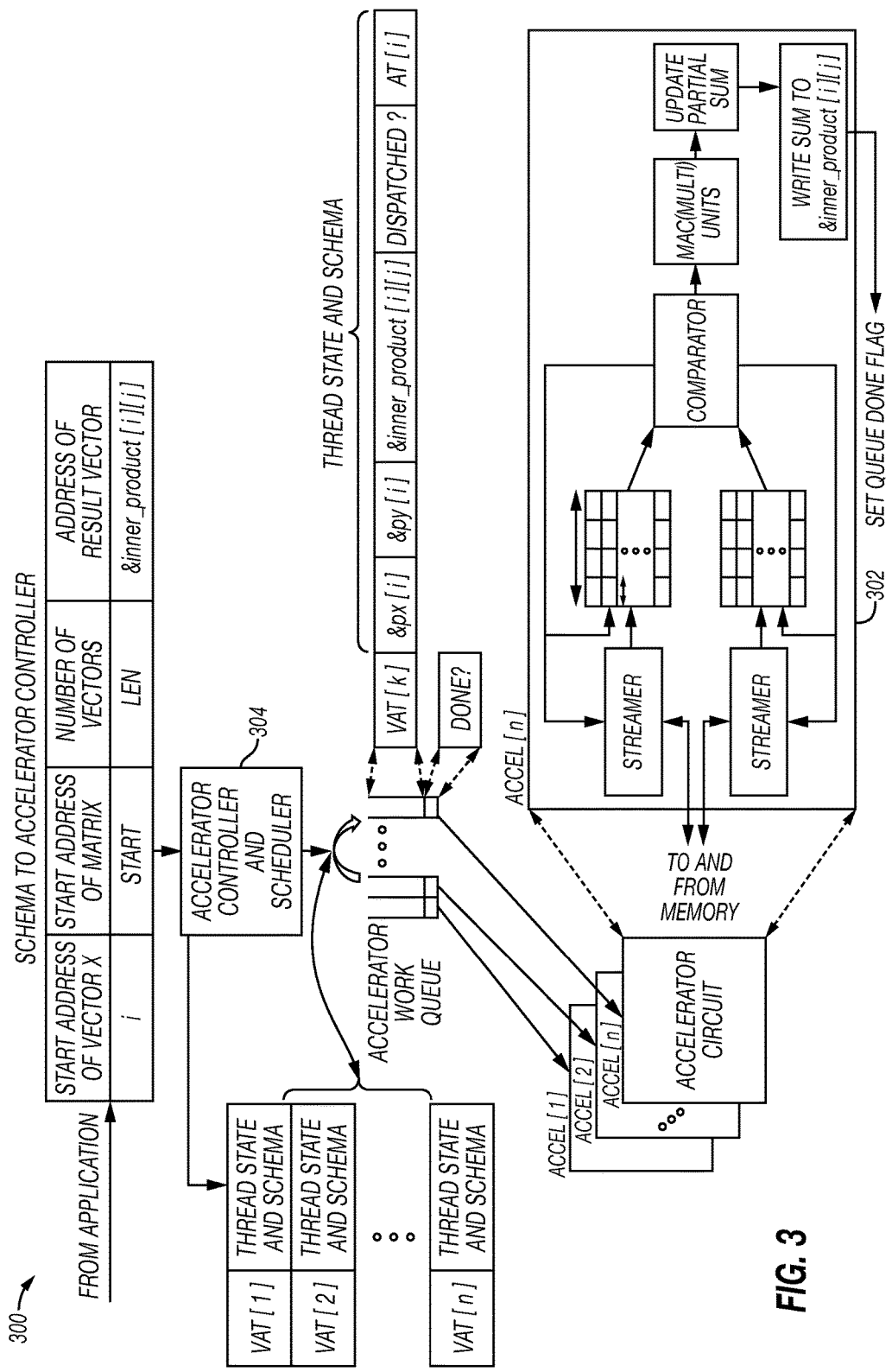
FIG. 3 illustrates an accelerator system to accelerate vector multiplication according to embodiments of the disclosure.

FIG. 3 illustrates an accelerator system 300 (e.g., complex) to accelerate vector multiplication according to embodiments of the disclosure. The term schema may generally refer to an information packet, e.g., which may invoke an accelerator complex and/or accelerator circuits. In one embodiment, an accelerator complex 300 includes one of more accelerator circuits 302, e.g., as disclosed herein. For example, accelerator circuit 302 may be accelerator circuit 100 or accelerator circuit 200. An accelerator complex may include hardware, software, firmware, or any combination thereof.

In certain embodiments, on receipt by the accelerator complex 300 of the schema (e.g., prepared by the compiler and embedded in the application binary), the accelerator controller (e.g., control logic) and scheduler 304 in the accelerator complex prepare a set of virtual accelerator threads (VATs) to be scheduled on the hardware accelerator circuit(s) (e.g., accelerator threads (ATs). These tasks may be queued into an accelerator work queue from which each of the hardware accelerators may pull work and notify completion with a done flag. This is schematically shown in FIG. 3.

Figure 4:
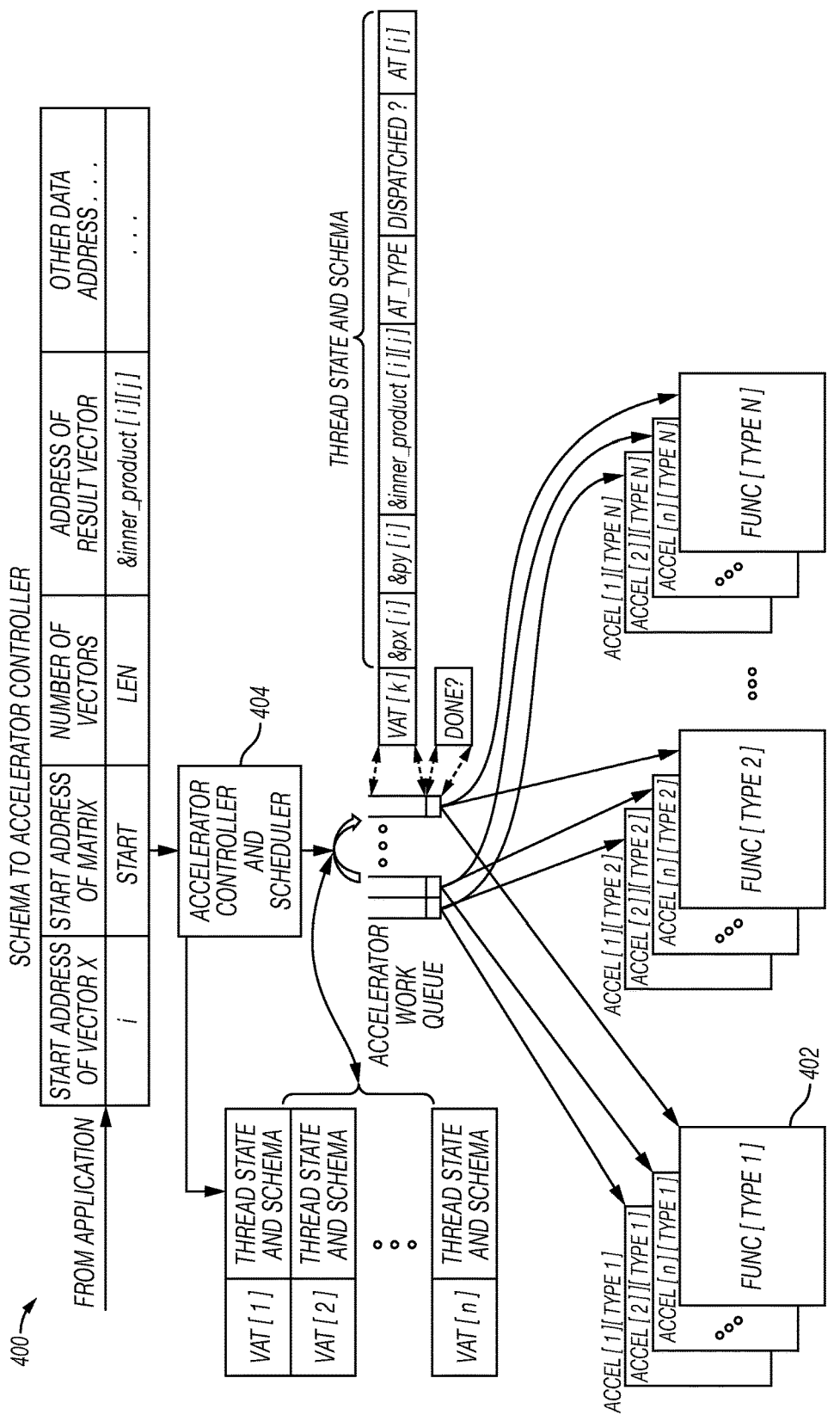
FIG. 4 illustrates an accelerator system to accelerate vector multiplication according to embodiments of the disclosure.

FIG. 4 illustrates an accelerator system 400 (e.g., complex) to accelerate vector multiplication according to embodiments of the disclosure. In one embodiment, accelerator circuits (e.g., 402) in the accelerator complex 400 may be utilized in parallel (e.g., chained together), e.g., instead of all the accelerators being of a single type, there may be multiple types (e.g., multiple of type1, multiple of type2, etc.). The scheduler 404 in this case may schedule tasks such that after a task is done on an accelerator of type1, that task is then scheduled on an accelerator of type2, and so on until the higher (e.g., highest) level task is done. One embodiment of this is an accelerator complex comprised of type1 accelerator circuit(s) to compute the squares (e.g., each of $\alpha^2$ and $\beta^2$) and type2 accelerator circuit(s) that compute the dot product ($\alpha \cdot \beta$). The scheduler 404 may then chain the output from both of these accelerator circuits to an execution (e.g., functional) unit that computes the final L2-norm in equation (1).

Figure 5:
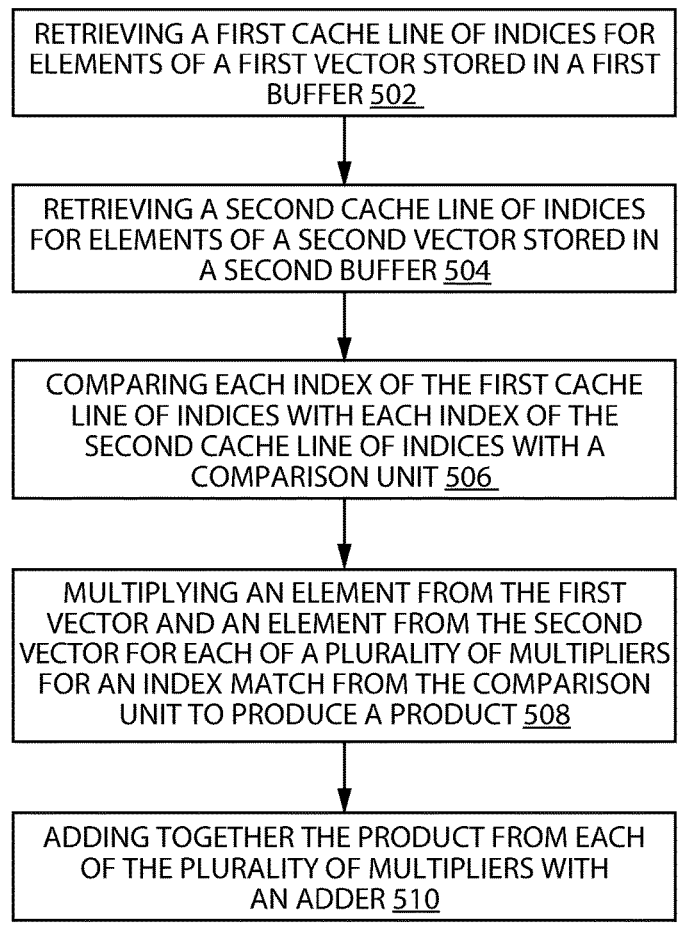
FIG. 5 illustrates a flow diagram of accelerating vector multiplication according to embodiments of the disclosure.

FIG. 5 illustrates a flow diagram 500 of accelerating vector multiplication according to embodiments of the disclosure. Flow diagram 500 includes retrieving a first cache line of indices for elements of a first vector stored in a first buffer 502, retrieving a second cache line of indices for elements of a second vector stored in a second buffer 504, comparing each index of the first cache line of indices with each index of the second cache line of indices with a comparison unit 506, multiplying an element from the first vector and an element from the second vector for each of a plurality of multipliers for an index match from the comparison unit to produce a product 508, and adding together the product from each of the plurality of multipliers with an adder 510.

An accelerator complex of a processor may be adjacent (e.g., close) to a core or in the uncore (e.g., in the cache, such as, but not limited to, level two or last level cache). If an accelerator complex is in the cache (e.g., L2, L3, or LLC) there may be less of a data movement cost, e.g., vector data may not be sent all the way up to L1 cache and/or register files in the core. In one embodiment of the dot (inner) product accelerator circuit, the accelerator circuit may not read its own output. The writes by the accelerator complex may be done using (e.g., user-specified) uncacheable speculative write combining (USWC) stores, e.g., streaming stores bypassing cache (e.g., L1, L2, L3, and/or LLC cache). When an accelerator complex is done with its assigned work, it may notify the core using a MWait instruction. A processor (e.g., core) may assign work to an accelerator complex using an (e.g., enqueue) instruction.

Certain embodiments of this disclosure may provide performance and/or efficient power usage improvement. For example, an accelerator circuit separate from a processor core may allow the core to be disengaged, (e.g., while the accelerator circuit is performing its operation), for example, allowing the (e.g., requesting) core to power down (e.g., idle) or do some other thread's (or application's) work. Data reuse of a vector may improve across multiple accelerator circuit invocations (e.g., can pin data for that vector in a cache). In one embodiment, the architecture of the accelerator circuit or accelerator complex is transparent to the programmer (e.g., it is virtualized) to allowing the hardware to accelerator vector multiplication operations without affecting the programmer. In one embodiment, if the accelerator circuit or accelerator complex is busy handling application A's work and application B invokes the accelerator circuit or accelerator complex, application B may get a busy status message, for example, it is then up to application B how to proceed, e.g., it may execute the threads on the core or wait for the accelerator circuit or accelerator complex to be available to do application B's work.

In one embodiment, an apparatus includes a first buffer to store a first cache line of indices for elements of a first vector, a second buffer to store a second cache line of indices for elements of a second vector, a comparison unit to compare each index of the first cache line of indices with each index of the second cache line of indices, and a plurality of multipliers to each multiply an element from the first vector and an element from the second vector for an index match from the comparison unit to produce a product. The apparatus may include an adder to add together the product from each of the plurality of multipliers. The apparatus may include a first streamer to provide an index and its element from a data storage device to the first buffer and a second streamer to provide an index and its element from the data storage device to the second buffer. The indices of the first cache line and the second cache line may not be in index order. The comparison unit may compare each index of the first cache line of indices with each index of the second cache line of indices in a single clock cycle of a processor. The cache line of indices for elements of the first vector and/or the second vector may also include each index's element. The plurality of multipliers may be a plurality of multiplier-accumulator units. The apparatus may include logic to notify a requesting processor core that operations on all elements of the first vector and the second vector are completed. The comparison unit may return each index of the first cache line to the first buffer and each index of the second cache line to the second buffer for non-matching indices.

In another embodiment, a method includes retrieving a first cache line of indices for elements of a first vector stored in a first buffer, retrieving a second cache line of indices for elements of a second vector stored in a second buffer, comparing each index of the first cache line of indices with each index of the second cache line of indices with a comparison unit, and multiplying an element from the first vector and an element from the second vector for each of a plurality of multipliers for an index match from the comparison unit to produce a product. The method may include adding together the product from each of the plurality of multipliers with an adder. The method may include providing an index and its element from a data storage device to the first buffer with a first streamer, and providing an index and its element from the data storage device to the second buffer with a second streamer. The method may include providing indices of the first cache line and the second cache line are not in index order. The comparing may be in a single clock cycle of a processor. The first cache line of indices for elements of the first vector may also include each index's element. The plurality of multipliers may be a plurality of multiplier-accumulator units. The method may include notifying a requesting processor core that operations on all elements of the first vector and the second vector are completed. The method may include returning each index of the first cache line to the first buffer and each index of the second cache line to the second buffer for non-matching indices.

In yet another embodiment, a system includes a data storage device to store a first vector and a second vector, a first buffer to store a first cache line of indices for elements of the first vector from the data storage device, a second buffer to store a second cache line of indices for elements of the second vector from the data storage device, a comparison unit to compare each index of the first cache line of indices with each index of the second cache line of indices, and a plurality of multipliers to each multiply an element from the first vector and an element from the second vector for an index match from the comparison unit to produce a product. The system may include an adder to add together the product from each of the plurality of multipliers. The system may include a first streamer to provide an index and its element from the data storage device to the first buffer and a second streamer to provide an index and its element from the data storage device to the second buffer. The indices of the first cache line and the second cache line may not be in index order. The comparison unit may compare each index of the first cache line of indices with each index of the second cache line of indices in a single clock cycle of a processor. The first cache line of indices for elements of the first vector may also include each index's element. The plurality of multipliers may be a plurality of multiplier-accumulator units. The system may further include logic to notify a requesting processor core that operations on all elements of the first vector and the second vector are completed. The comparison unit may return each index of the first cache line to the first buffer and each index of the second cache line to the second buffer for non-matching indices.

In another embodiment, an apparatus includes means for retrieving a first cache line of indices for elements of a first vector stored in a first buffer, means for retrieving a second cache line of indices for elements of a second vector stored in a second buffer, means for comparing each index of the first cache line of indices with each index of the second cache line of indices with a comparison unit, and means for multiplying an element from the first vector and an element from the second vector for each of a plurality of multipliers for an index match from the comparison unit to produce a product. The apparatus may include means for adding together the product from each of the plurality of multipliers with an adder. An apparatus to accelerate vector multiplication may be as described in the detailed description. A method for accelerating vector multiplication may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 6A is a block diagram illustrating both an exemplary in-order pipeline and an exemplary register renaming, out-of-order issue/execution pipeline according to embodiments of the disclosure. FIG. 6B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file unit(s) 658. Each of the physical register file unit(s) 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file unit(s) 658 comprises a vector registers unit, a write mask registers unit, and a scalar registers unit. These register units may provide architectural vector registers, vector mask registers, and general purpose registers. The physical register file unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file unit(s) 658 and the memory unit 670 perform the register read/memory read stage 614; the execution cluster 660 perform the execute stage 616; 6) the memory unit 670 and the physical register file unit(s) 658 perform the write back/memory write stage 618; 7) various units may be involved in the exception handling stage 622; and 8) the retirement unit 654 and the physical register file unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 7A:
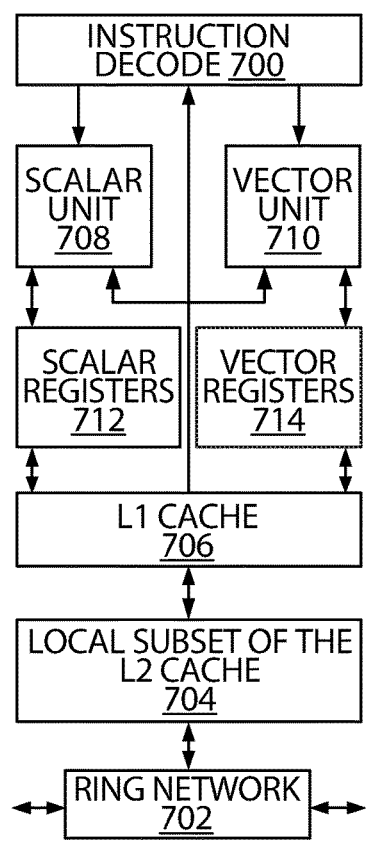
FIG. 7A is a block diagram of a single processor core, along with its connection to the on-die interconnect network and with its local subset of the Level 2 (L2) cache, according to embodiments of the disclosure.
Figure 7B:
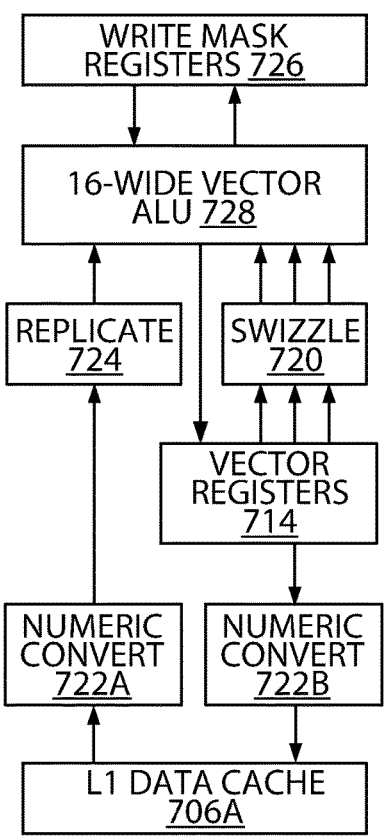
FIG. 7B is an expanded view of part of the processor core in FIG. 7A according to embodiments of the disclosure.

FIGS. 7A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 7A is a block diagram of a single processor core, along with its connection to the on-die interconnect network 702 and with its local subset of the Level 2 (L2) cache 704, according to embodiments of the disclosure. In one embodiment, an instruction decode unit 700 supports the x86 instruction set with a packed data instruction set extension. An L1 cache 706 allows low-latency accesses to cache memory into the scalar and vector units. While in one embodiment (to simplify the design), a scalar unit 708 and a vector unit 710 use separate register sets (respectively, scalar registers 712 and vector registers 714) and data transferred between them is written to memory and then read back in from a level 1 (L1) cache 706, alternative embodiments of the disclosure may use a different approach (e.g., use a single register set or include a communication path that allow data to be transferred between the two register files without being written and read back).

The local subset of the L2 cache 704 is part of a global L2 cache that is divided into separate local subsets, one per processor core. Each processor core has a direct access path to its own local subset of the L2 cache 704. Data read by a processor core is stored in its L2 cache subset 704 and can be accessed quickly, in parallel with other processor cores accessing their own local L2 cache subsets. Data written by a processor core is stored in its own L2 cache subset 704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 7B is an expanded view of part of the processor core in FIG. 7A according to embodiments of the disclosure. FIG. 7B includes an L1 data cache 706A part of the L1 cache 704, as well as more detail regarding the vector unit 710 and the vector registers 714. Specifically, the vector unit 710 is a 16-wide vector processing unit (VPU) (see the 16-wide ALU 728), which executes one or more of integer, single-precision float, and double-precision float instructions. The VPU supports swizzling the register inputs with swizzle unit 720, numeric conversion with numeric convert units 722A-B, and replication with replication unit 724 on the memory input. Write mask registers 726 allow predicating resulting vector writes.

Figure 8:
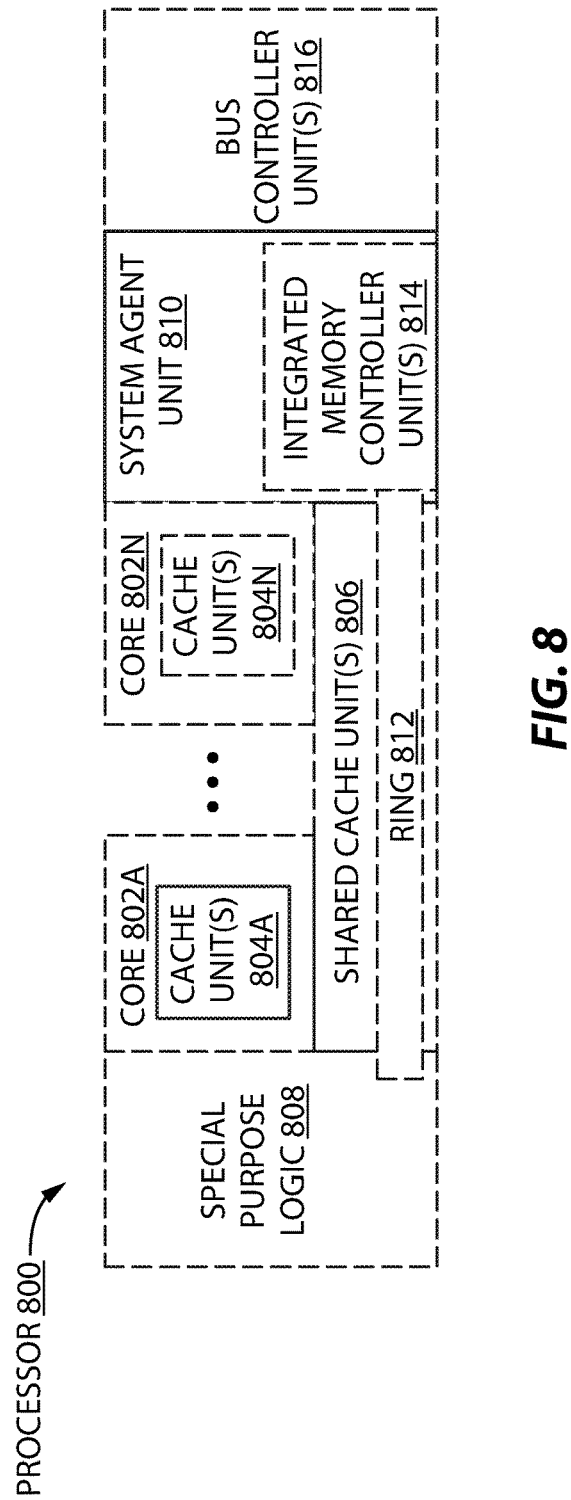
FIG. 8 is a block diagram of a processor that may have more than one core, may have an integrated memory controller, and may have integrated graphics according to embodiments of the disclosure.

FIG. 8 is a block diagram of a processor 800 that may have more than one core, may have an integrated memory controller, and may have integrated graphics according to embodiments of the disclosure. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) 814 in the system agent unit 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache (e.g., cache unit(s) 804A-N) within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the integrated graphics logic 808, the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802-A-N.

In some embodiments, one or more of the cores 802A-N are capable of multithreading. The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

Exemplary Computer Architectures

FIGS. 9-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
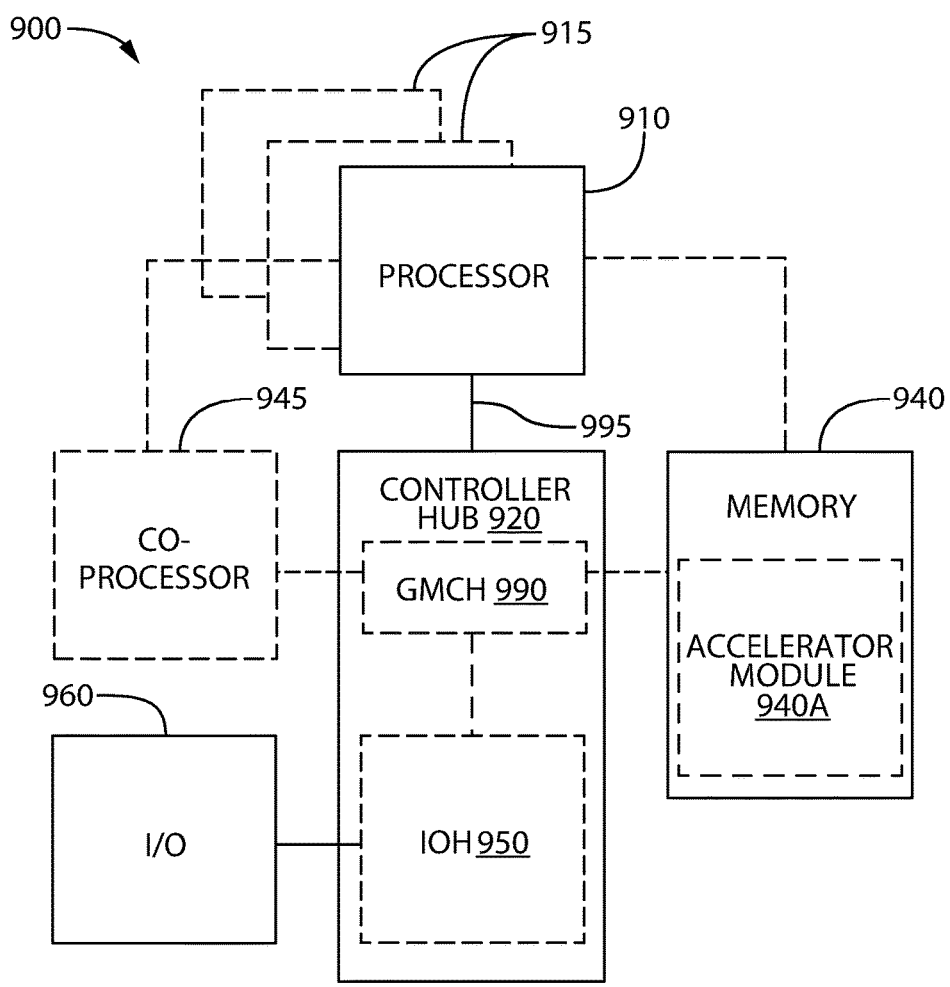
FIG. 9 is a block diagram of a system in accordance with one embodiment of the present disclosure.

Referring now to FIG. 9, shown is a block diagram of a system 900 in accordance with one embodiment of the present disclosure. The system 900 may include one or more processors 910, 915, which are coupled to a controller hub 920. In one embodiment the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 is couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950. Memory 940 may include an accelerator binary translator module 940A, for example, to store code that when executed causes a processor to perform any method of this disclosure.

The optional nature of additional processors 915 is denoted in FIG. 9 with broken lines. Each processor 910, 915 may include one or more of the processing cores described herein and may be some version of the processor 800.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
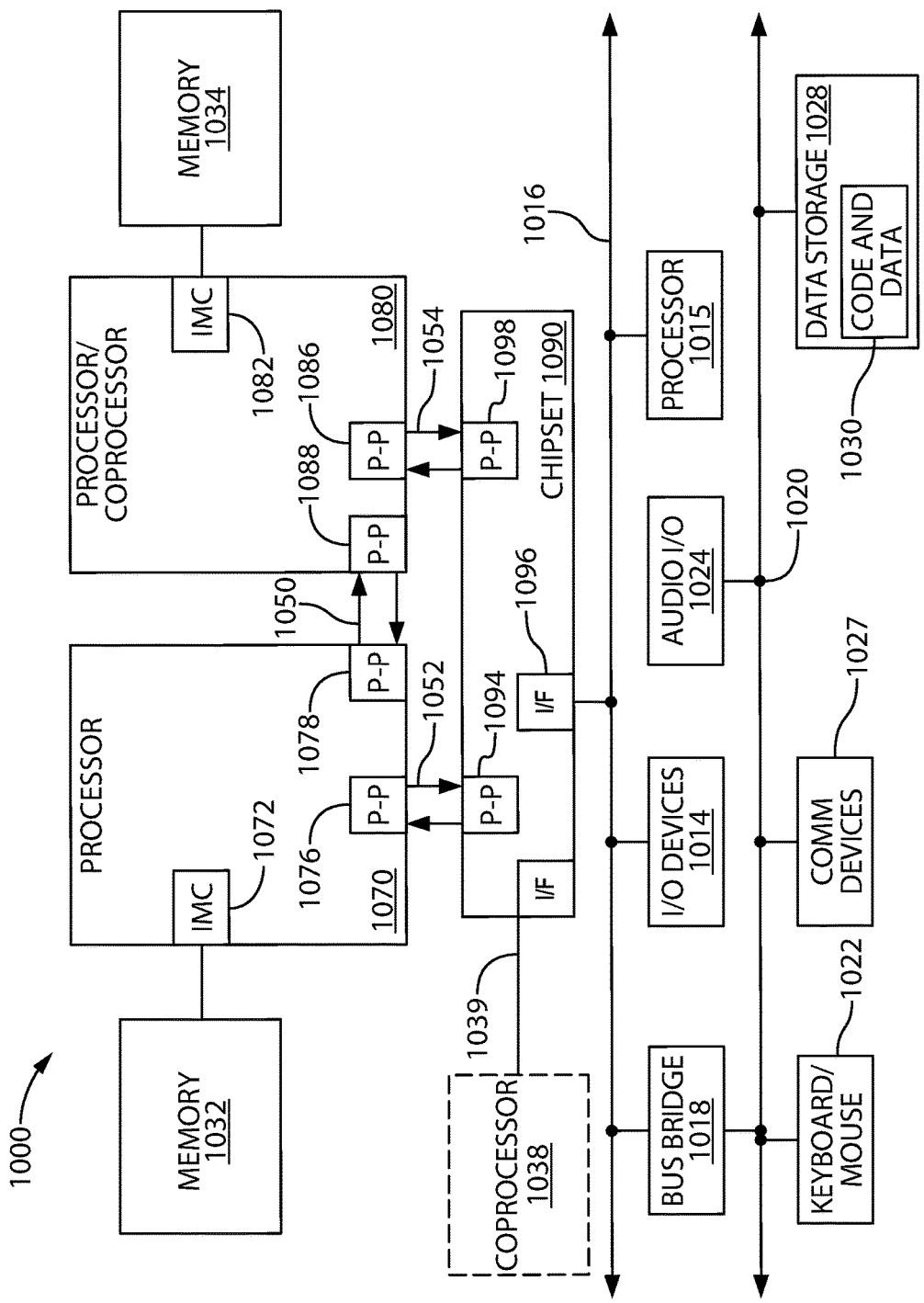
FIG. 10 is a block diagram of a more specific exemplary system in accordance with an embodiment of the present disclosure.

Referring now to FIG. 10, shown is a block diagram of a first more specific exemplary system 1000 in accordance with an embodiment of the present disclosure. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 800. In one embodiment of the disclosure, processors 1070 and 1080 are respectively processors 910 and 915, while coprocessor 1038 is coprocessor 945. In another embodiment, processors 1070 and 1080 are respectively processor 910 coprocessor 945.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1039. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present disclosure is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

Figure 11:
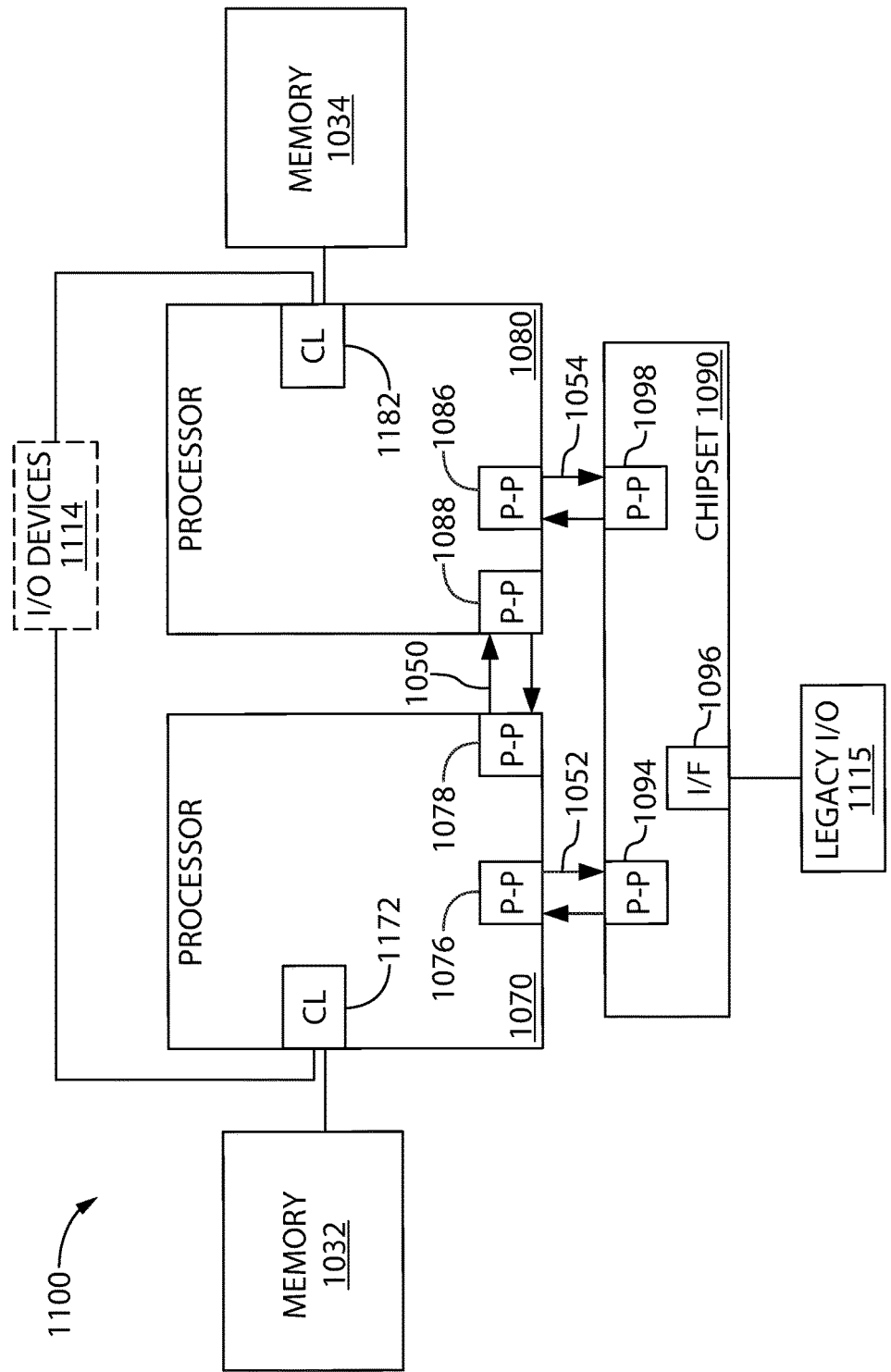
FIG. 11, shown is a block diagram of a second more specific exemplary system in accordance with an embodiment of the present disclosure.

Referring now to FIG. 11, shown is a block diagram of a second more specific exemplary system 1100 in accordance with an embodiment of the present disclosure. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1070, 1080 may include integrated memory and I/O control logic ("CL") 1172 and 1182, respectively. Thus, the CL 1172, 1182 include integrated memory controller units and include I/O control logic. FIG. 11 illustrates that not only are the memories 1032, 1034 coupled to the CL 1172, 1182, but also that I/O devices 1114 are also coupled to the control logic 1172, 1182. Legacy I/O devices 1115 are coupled to the chipset 1090.

Figure 12:
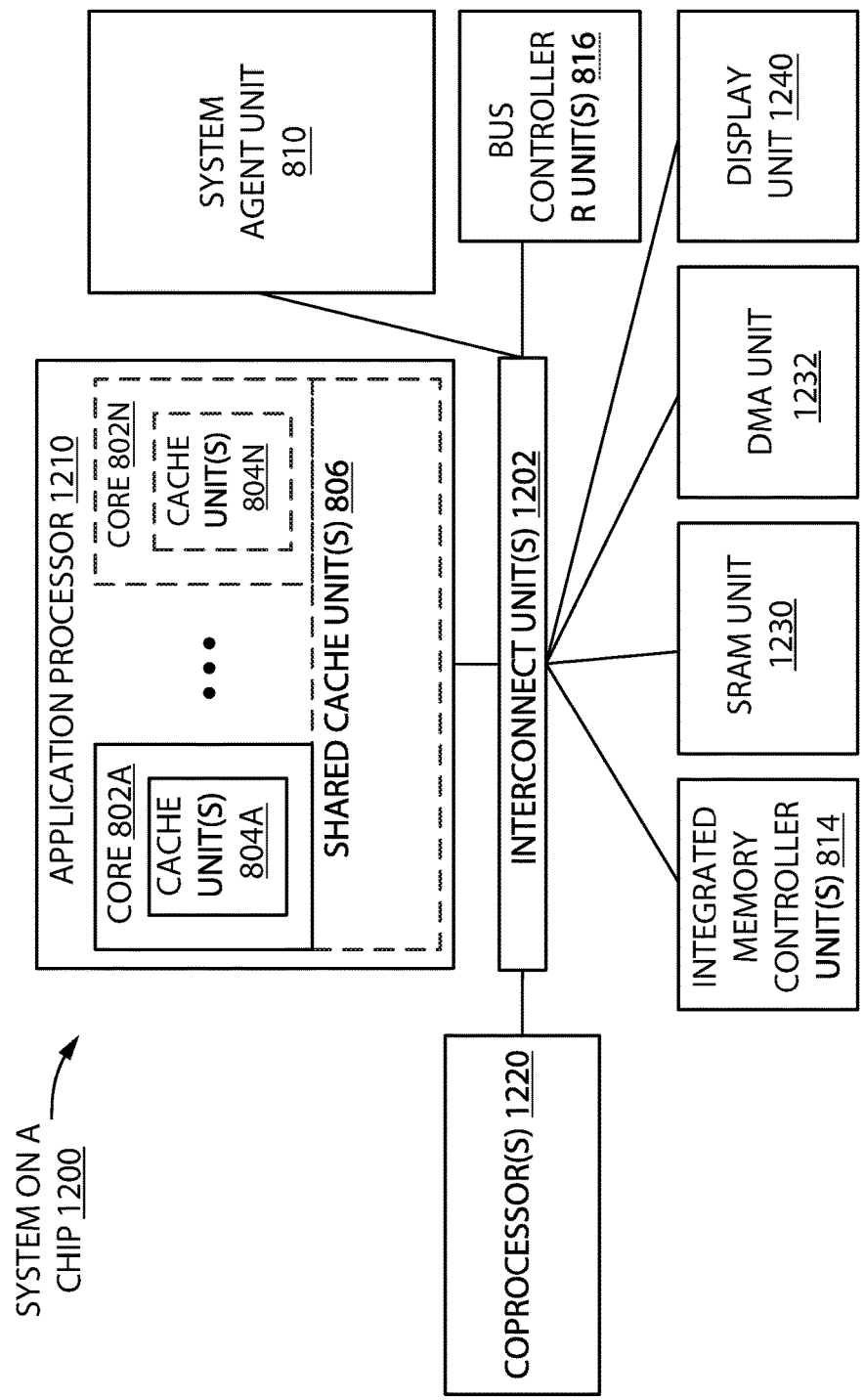
FIG. 12, shown is a block diagram of a system on a chip (SoC) in accordance with an embodiment of the present disclosure.

Referring now to FIG. 12, shown is a block diagram of a SoC 1200 in accordance with an embodiment of the present disclosure. Similar elements in FIG. 8 bear like reference numerals. Also, dashed lined boxes are optional features on more advanced SoCs. In FIG. 12, an interconnect unit(s) 1202 is coupled to: an application processor 1210 which includes a set of one or more cores 202A-N and shared cache unit(s) 806; a system agent unit 810; a bus controller unit(s) 816; an integrated memory controller unit(s) 814; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 13:
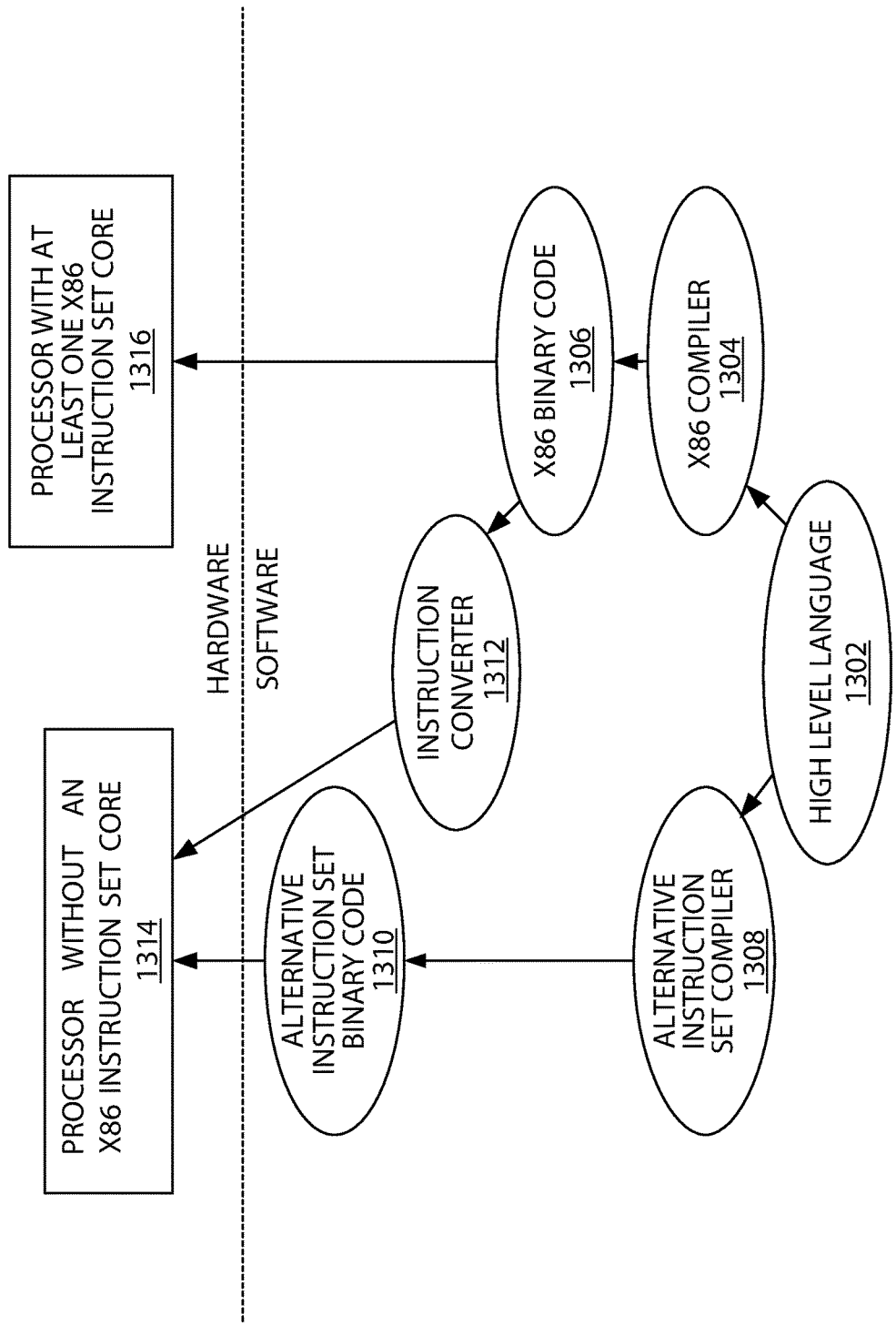
FIG. 13 is a block diagram contrasting the use of a software instruction converter to convert binary instructions in a source instruction set to binary instructions in a target instruction set according to embodiments of the disclosure.

FIG. 13 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

What is claimed is:

1. An apparatus comprising:
a first buffer to store a first cache line of indices for elements of a first vector;
a second buffer to store a second cache line of indices for elements of a second vector;
a comparison unit to compare each index of the first cache line of indices with each index of the second cache line of indices;
a plurality of multipliers to each multiply an element from the first vector and an element from the second vector for an index match from the comparison unit to produce a product; and
an adder to add together the product from each of the plurality of multipliers.

2. The apparatus of claim 1, wherein a first streamer is to provide an index and its element from a data storage device to the first buffer and a second streamer is to provide an index and its element from the data storage device to the second buffer.

3. The apparatus of claim 1, wherein the indices of the first cache line and the second cache line are not in index order.

4. The apparatus of claim 1, wherein the comparison unit is to compare each index of the first cache line of indices with each index of the second cache line of indices in a single clock cycle of a processor.

5. The apparatus of claim 1, wherein the first cache line of indices for elements of the first vector also includes each index's element.

6. The apparatus of claim 1, wherein the plurality of multipliers are a plurality of multiplier-accumulator units.

7. The apparatus of claim 1, further comprising logic to notify a requesting processor core that operations on all elements of the first vector and the second vector are completed.

8. The apparatus of claim 1, wherein the comparison unit is to return each index of the first cache line to the first buffer and each index of the second cache line to the second buffer for non-matching indices.

9. A method comprising:
retrieving a first cache line of indices for elements of a first vector stored in a first buffer;
retrieving a second cache line of indices for elements of a second vector stored in a second buffer;
comparing each index of the first cache line of indices with each index of the second cache line of indices with a comparison unit;
multiplying an element from the first vector and an element from the second vector for each of a plurality of multipliers for an index match from the comparison unit to produce a product; and
adding together the product from each of the plurality of multipliers with an adder.

10. The method of claim 9, further comprising:
providing an index and its element from a data storage device to the first buffer with a first streamer, and providing an index and its element from the data storage device to the second buffer with a second streamer.

11. The method of claim 9, wherein the indices of the first cache line and the second cache line are not in index order.

12. The method of claim 9, wherein the comparing is in a single clock cycle of a processor.

13. The method of claim 9, wherein the first cache line of indices for elements of the first vector also includes each index's element.

14. The method of claim 9, wherein the plurality of multipliers are a plurality of multiplier-accumulator units.

15. The method of claim 9, further comprising notifying a requesting processor core that operations on all elements of the first vector and the second vector are completed.

16. The method of claim 9, further comprising returning each index of the first cache line to the first buffer and each index of the second cache line to the second buffer for non-matching indices.

17. A system comprising:
a data storage device to store a first vector and a second vector;
a first buffer to store a first cache line of indices for elements of the first vector from the data storage device;
a second buffer to store a second cache line of indices for elements of the second vector from the data storage device;
a comparison unit to compare each index of the first cache line of indices with each index of the second cache line of indices;
a plurality of multipliers to each multiply an element from the first vector and an element from the second vector for an index match from the comparison unit to produce a product; and
an adder to add together the product from each of the plurality of multipliers.

18. The system of claim 17, wherein a first streamer is to provide an index and its element from the data storage device to the first buffer and a second streamer is to provide an index and its element from the data storage device to the second buffer.

19. The system of claim 17, wherein the indices of the first cache line and the second cache line are not in index order.

20. The system of claim 17, wherein the comparison unit is to compare each index of the first cache line of indices with each index of the second cache line of indices in a single clock cycle of a processor.

21. The system of claim 17, wherein the first cache line of indices for elements of the first vector also includes each index's element.

22. The system of claim 17, wherein the plurality of multipliers are a plurality of multiplier-accumulator units.

23. The system of claim 17, further comprising logic to notify a requesting processor core that operations on all elements of the first vector and the second vector are completed.

24. The system of claim 17, wherein the comparison unit is to return each index of the first cache line to the first buffer and each index of the second cache line to the second buffer for non-matching indices.

* * * * *